US005516003A

United States Patent [19]

Hebert

[11] Patent Number: 5,516,003

[45] Date of Patent: May 14, 1996

[54] MULTIPLE CHOICE VENDING MACHINE FOR NEWSPAPERS AND THE LIKE

[76] Inventor: Maurice Hebert, 4 rue des Courlis, 67100 Strasbourg, France

[21] Appl. No.: 307,771

[22] PCT Filed: Mar. 25, 1993

[86] PCT No.: PCT/FR93/00301

§ 371 Date: Nov. 28, 1994

§ 102(e) Date: Nov. 28, 1994

[87] PCT Pub. No.: WO93/20540

PCT Pub. Date: Oct. 14, 1993

[30] Foreign Application Priority Data

Mar. 27, 1992 [FR] France .................................. 92 03931

[51] Int. Cl.[6] ............................ G07F 11/00; B65G 59/00

[52] U.S. Cl. .......................... 221/130; 221/131; 221/213; 221/155; 221/193; 221/195; 221/232; 221/242

[58] Field of Search .................................... 221/130, 131, 221/210, 213, 155, 193, 195, 231, 232, 241, 242, 244

[56] References Cited

U.S. PATENT DOCUMENTS

| | | | |
|---|---|---|---|
| 1,277,568 | 9/1918 | Giardi | 221/244 |
| 2,501,970 | 3/1950 | Sawitzke | 221/244 |
| 2,576,636 | 11/1951 | Opgenorth | 221/213 |
| 3,655,092 | 4/1972 | Hall et al. | 221/244 |
| 3,757,998 | 9/1973 | Millies et al. | 221/242 |
| 4,821,916 | 4/1989 | Dewaele | 221/231 |

FOREIGN PATENT DOCUMENTS

| | | |
|---|---|---|
| 0193797 | 9/1986 | European Pat. Off. . |
| 1541211 | 8/1968 | France . |
| 2081975 | 12/1971 | France . |
| 2089943 | 1/1972 | France . |
| 2162550 | 7/1973 | France . |
| 2608570 | 6/1988 | France . |
| 2006174 | 5/1979 | United Kingdom . |
| WO87/00664 | 1/1987 | WIPO . |

*Primary Examiner*—H. Grant Skaggs
*Attorney, Agent, or Firm*—Young & Thompson

[57] ABSTRACT

Vending machine (1) for newspapers, in the form of a cabinet capable of automatically delivering into a receptacle one copy of a newspaper which a purchaser has selected from a plurality of other newspapers and paid for with a payment device incorporated in the vending machine. The cabinet comprises fixed and movable shelves on which the newspapers are stored in various stacks each of a same newspaper. On each of the stacks is provided an individual discharge assembly for the upper newspaper of the stack of newspapers. There are two columns of fixed horizontal shelves (56) secured at each side to two vertical supports (61, 62) welded at their ends to the upper and lower parts of the cabinet and at least one movable shelf for each column. Each discharge assembly for the upper newspaper from a stack of newspapers is displaceable relative to the shelf supporting that stack. There is a guide for guiding the newspaper forming a guide path from the edge of the stack from which it is removed, to the receptacle of the cabinet.

13 Claims, 17 Drawing Sheets

MULTIPLE CHOICE VENDING MACHINE FOR NEWSPAPERS AND THE LIKE

The present invention relates to a multiple choice vending machine for newspapers or magazines.

It has for its object to extend to products of the press the automated and unmanned distribution format operated by a coin box or a credit card or payment, already existing in a number of fields: food, beverages, cigarettes . . . .

The distribution of newspapers is generally effected in four distinct ways.

First of all, there is home delivery according to which a carrier delivers each morning to the home of each customer, the daily item subscribed to.

The second is by mail effected by administrative services and employees of the post office.

The third covers all commercial distribution at points of sale, including stands in public places: train stations, squares, parks . . . where there are stores, boutiques or departments specializing in the press: libraries, printing plants, specialized departments in supermarkets . . . .

The fourth way concerns automatic distribution of newspapers and magazines.

In this field, automation has not penetrated far, contrary to other fields such as food, tobacco, beverages . . . .

There exist only single item distributors of little mechanism, in which newspapers are first inserted into separate compartments in the manner of beverages or sweets.

This lack is all the more surprising because of the various and numerous difficulties connected with the rapid and damage-free removal of a newspaper from a pile of stacked copies.

By way of example there will be given hereafter several of the important and numerous difficulties:

- to grasp each time only a single newspaper, without pulling out the following paper or papers;
- avoiding tearing, abrasion or any other damage to the paper;
- keeping together a copy with multiple pages;
- maintaining the stack and avoiding particularly its toppling in the direction of removal of the upper newspaper;
- adapting the dispensing assembly to different formats and weights of copies.

A vending machine has the general shape of a cabinet capable of delivering automatically into a receptacle one copy of the newspaper which a customer has selected and paid for into a payment device incorporated in the vending machine. The different newspapers are stored by title in stacks on shelves within the vending machine. A dispensing assembly rests on each stack. It permits pushing the newspapers from the stack one after another, moving with the upper newspaper which slides from the stack and bearing on the newspaper below without moving the following newspapers, and directing the newspaper toward a vertical hopper followed by a guardway which guides it to a receptacle accessible to the purchaser.

There are already known several machines of this type, but they are little developed, because their pusher systems seem to be little adaptable to the great variety of formats and weights of newspapers. Moreover, their undependability and their tendency to cause tears constitute also further drawbacks.

To this end, FR-A-2 089 943 and FR-A-2 081 975 describe apparatuses in the form of cabinets for the distribution of newspapers, whose lower part of the cabinet is occupied by the reception space for the newspapers or of any other documents sold or distributed by means of these apparatus. There is as a result a large loss of space or volume and commercial uselessness.

Moreover, the outlet level, hence for grasping the newspaper or the document by its purchaser, being located in the lower part of the apparatus, which is to say near ground level, the purchaser is obliged to stoop over to grasp his purchase, such that certain categories of purchasers, such as physically handicapped and elderly people can encounter access difficulties.

The problem to be solved by the present invention consists in using the lower space of the cabinet, while permitting an outlet level of the newspapers or other documents farther removed from the ground, such that the space lost in known apparatus to this day can be used commercially and that, because of a location of the outlet for the newspapers or other documents at a level farther from the ground, purchasers enjoy better comfort.

The technical characteristics and other advantages of the invention are to be seen from the description which follows, given by way of non-limiting example as to one embodiment with reference to the accompanying drawings, in which.

Figure 22:
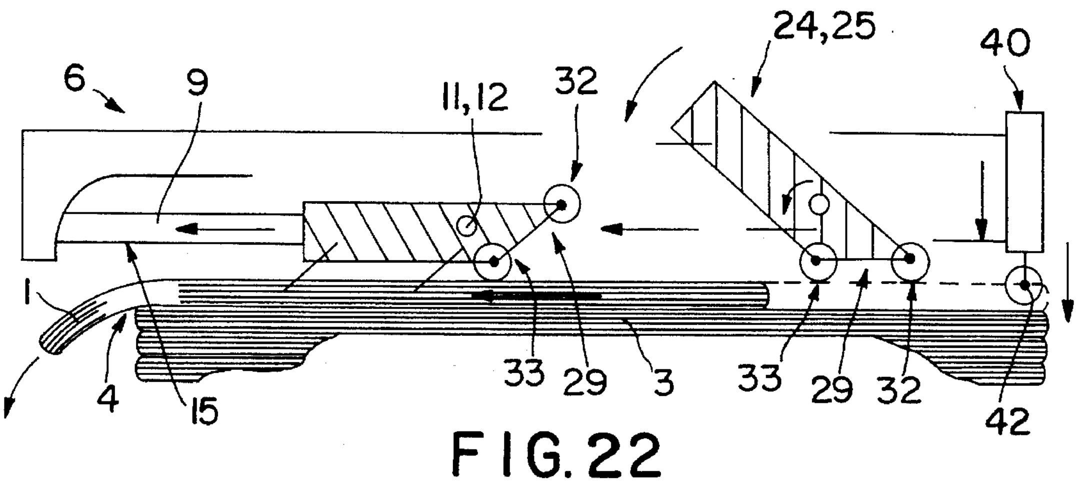
FIGS. 22 to 28 show, in the form of a series of schematics corresponding to cross sectional views, the operation of one of the drives on the delivery assembly according to the invention, according to the following sequence.
Figure 23:
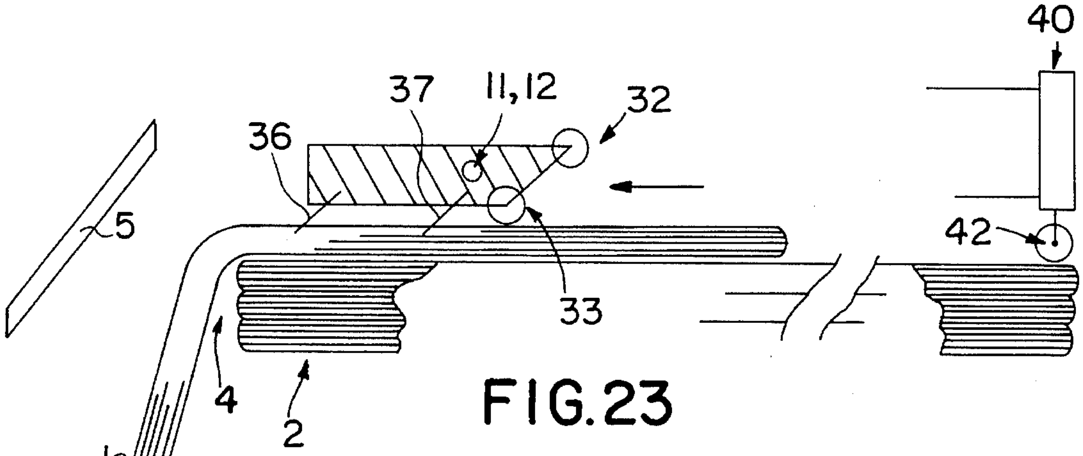
Figure 24:
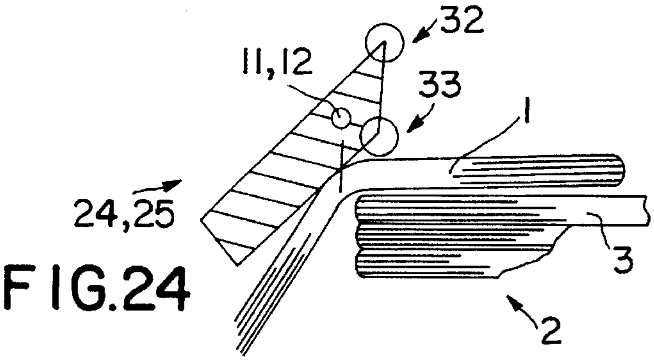
Figure 25:
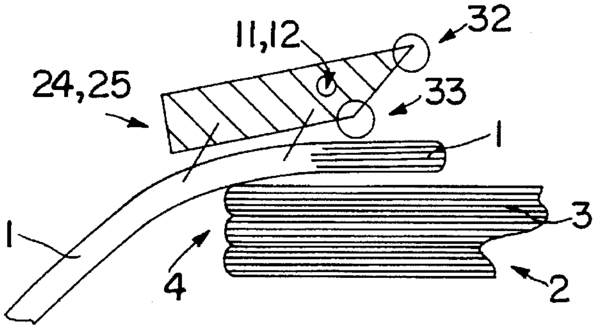
Figure 26:
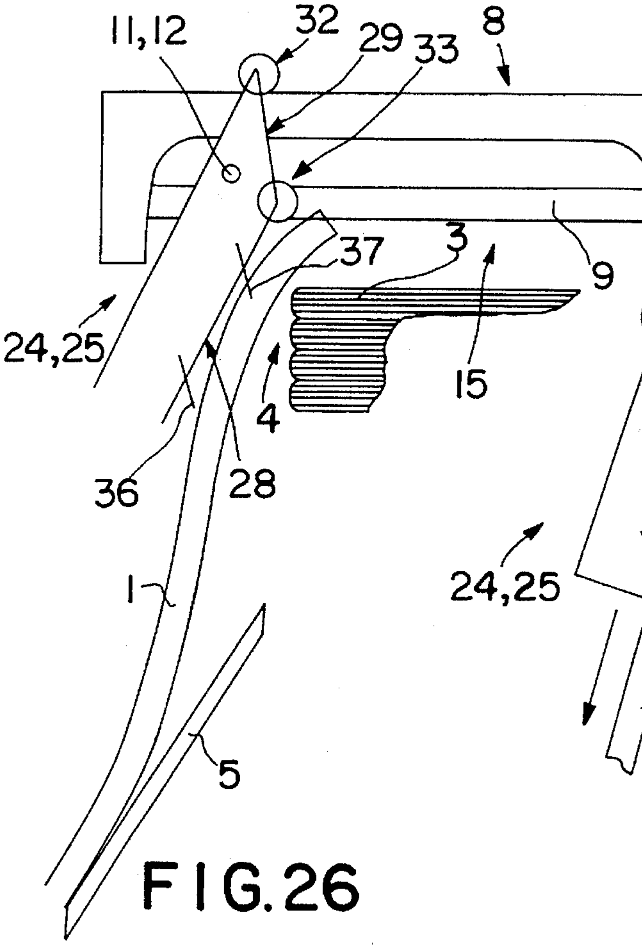
Figure 27:
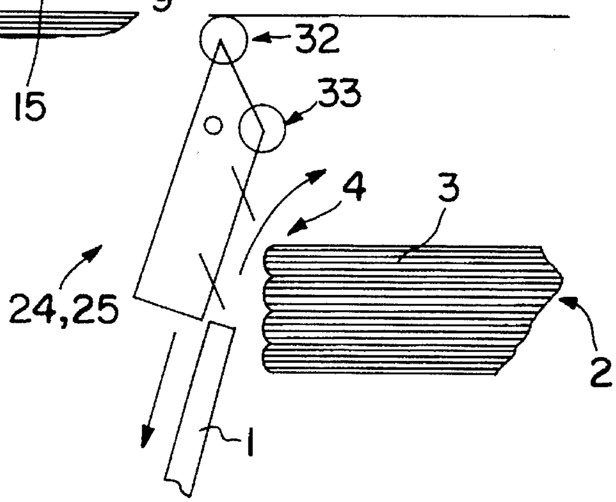
Figure 28:
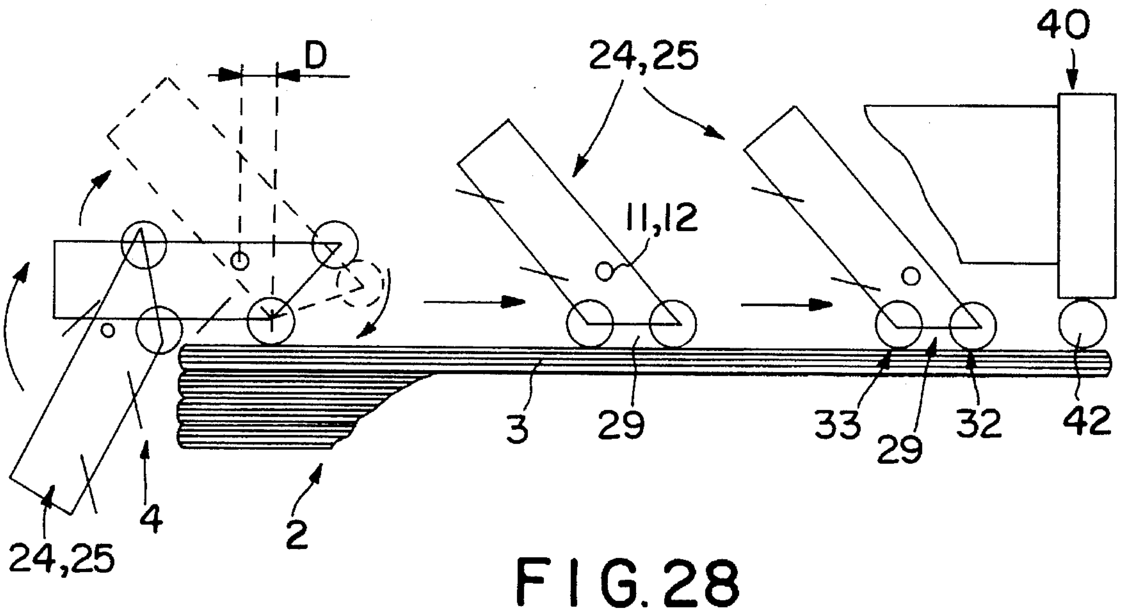

FIG. 22: multiple view of shoes in rest position and at about mid path;

FIGS. 23, 24, 25: three successive phases during passage about the shoulder at the edge of a stack;

FIG. 26: shoe in engagement by a single pair of claws just before releasing the copy;

FIG. 27: shoe in the course of rising after releasing the copy;

FIG. 28: multiple view of the shoes in raised position then in raised and wheel-down position, at mid course and at rest.

The present invention relates to a vending machine for newspapers using a plurality of functional units called dispensing assemblies or devices of which an example will be described hereafter with reference to FIGS. 15–28.

The term newspaper will be used here to designate copies moved from the stack by the discharge assembly. Of course this latter can be used for a number of other flat analogous multi-sheet objects such as prospectuses, books, multiple sheets, magazines . . . .

Figure 15:
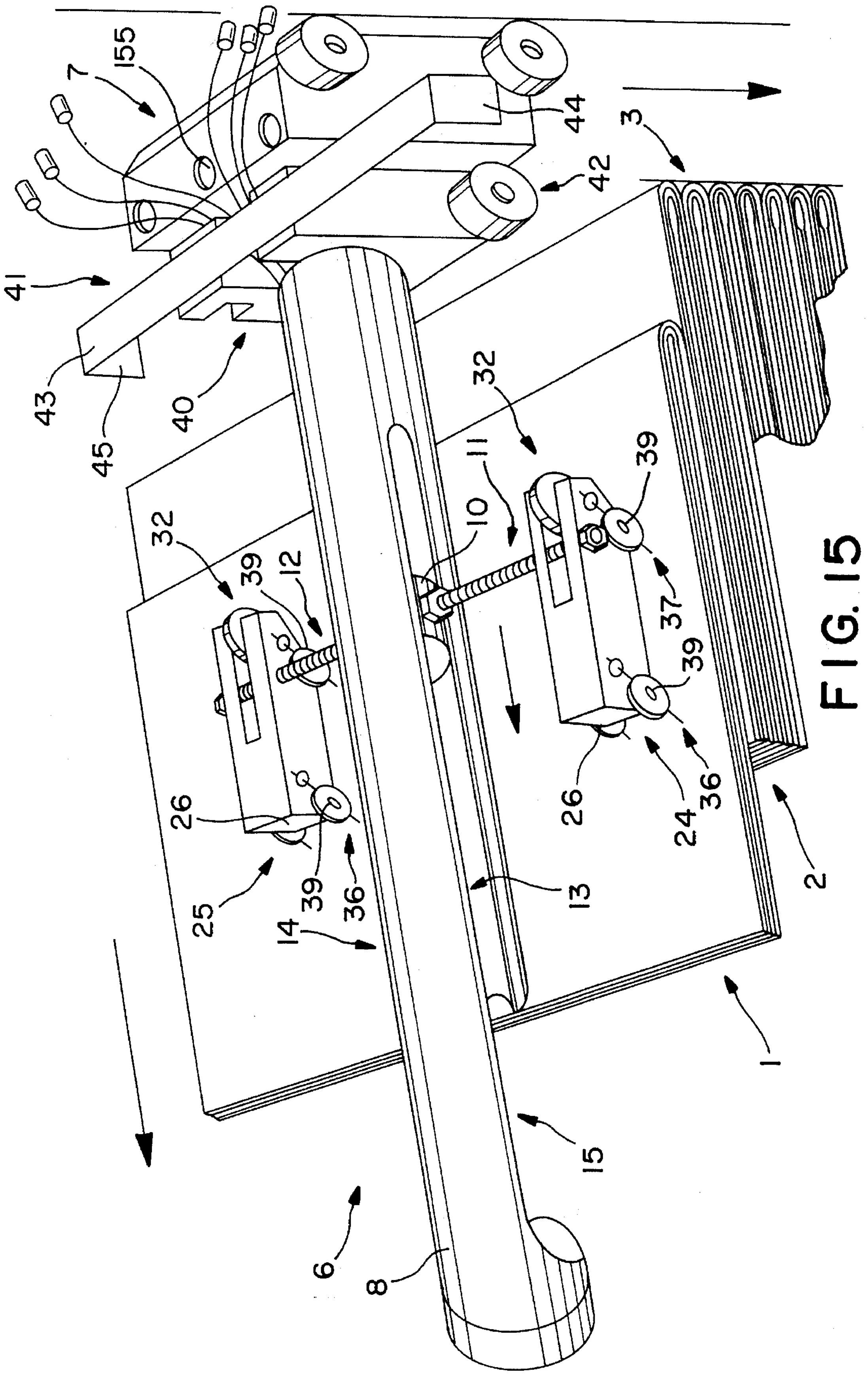
FIG. 15 is an assembly perspective view of the delivery mechanism according to the invention.
Figure 16:
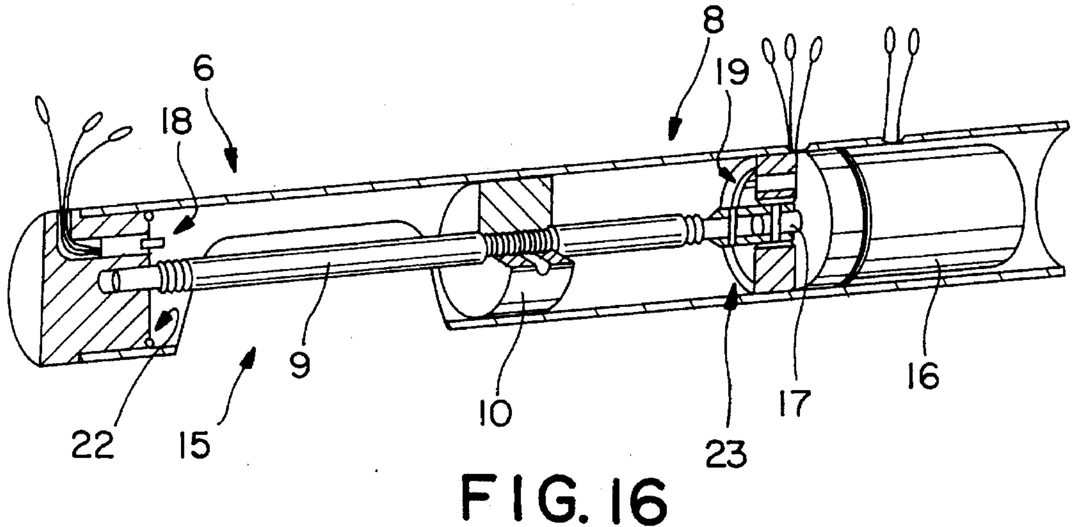
FIG. 16 is a mixed view in cross section and in perspective of the horizontal electro-mechanical actuator used for moving and delivery of the newspaper.
Figure 17:
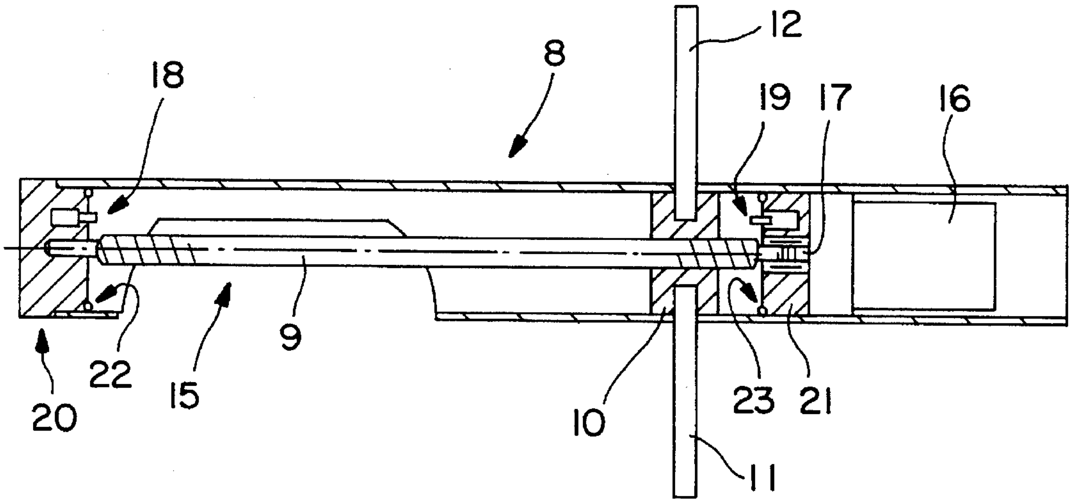
FIG. 17 is a longitudinal cross sectional view of the electro-mechanical actuator used.
Figure 18:
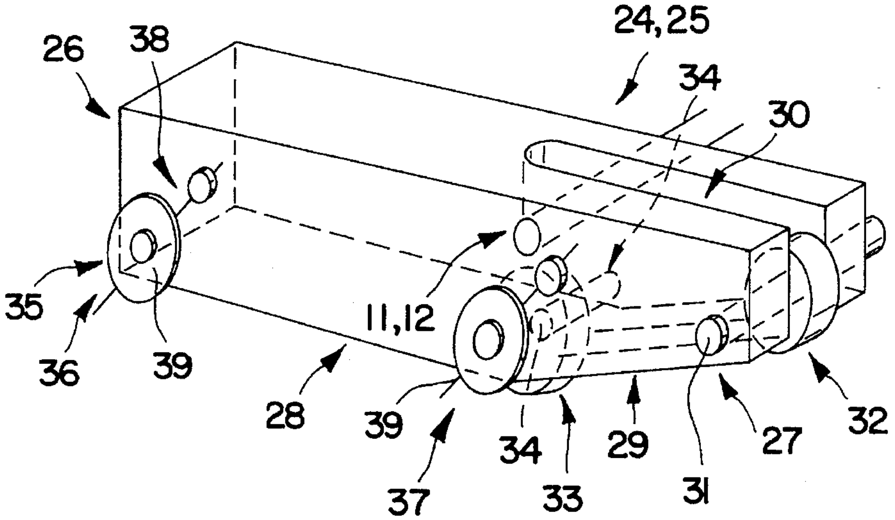
FIG. 18 is a perspective view of a first embodiment of drive shoes.

The discharge assembly generally shown in FIG. 15 has for its essential function to enter into gripping engagement with a first newspaper 1 from a stack of newspapers, for example by gripping it, then causing it to slide on the immediately lower newspaper 3 to a transverse edge 4 of the stack, without crumpling or damaging it, and without moving the following papers. It then deflects it angularly and moves with it in an arcuate path about the edge 4 of the stack 2 to clear the latter before freeing it for its fall along a deflector 5 toward; and up to a receptacle. The discharge assembly then returns to its initial position.

The essential means shown in FIG. 15 comprise an electromechanical actuator 6 disposed horizontally and fixed at its rear on an actuator-carrying slider 7 that can move vertically along two vertical slideways not shown in FIG. 15.

The actuator 6 is preferably of the electro-mechanical type, for example such as that described hereinafter.

It has a hollow cylindrical tubular body 8 enclosing a central screw 9 disposed longitudinally and bearing on two end bearings. It drives a motor element in the form of a drive nut 10 of a shape and size appropriate to move within the interior of the tubular body 8. The drive nut 10 has two lateral outlets on each of which is secured a transverse shoe-carrying axle 11 or 12 extending perpendicularly through two openings 13 and 14 or longitudinal slots in the body 8 to permit the movement of the drive nut 10 provided with its axles.

The tubular body 8 has at its forward end a longitudinal opening or downwardly opening recess in the form of a recess 15 used, as will be seen hereafter, for the disengagement of the end of the newspaper.

The central screw 9 is connected by any appropriate means to an electric motor 16 by its output shaft 17 disposed preferably within the body 8 at its rear end. The assembly of the central screw 9 and motor 16 permits driving the drive nut 10 with a horizontal reciprocatory movement between two end-of-path contacts or proximity detectors 18 and 19 secured on the one hand to a bearing plug 20 at the end of the body, and on the other hand to a coupling ring 21 on the side of the electric motor 16. A central screw 9 bears at its ends on the bearing plug 20 on the one hand, and on the coupling ring 21 on the other hand. The bearing plug 20 and the coupling ring 21 are of self-lubricating material, and each is provided on its front with a toric joint 22 or 23 serving as a shock absorber.

The coupling can be effected also simply by a pin which interconnects the adjacent ends of the central screw 9 and the output shaft 17 of the motor 16. In this case, the coupling ring 21 plays only the role of supporting the toric joint shock absorber 22 or 23.

Each shoe-carrying axle 11 or 12 carries freely pivotally at its end a movable shoe 24 or 25.

The body of each shoe 24 or 25 has a generally parallelepipedal shape with a rectangular trapezoidal profile. The front surface 26 is flat while the rear portion is chamfered, having the shape of a nose 27 which is raised and directed rearwardly of the stack 2 of newspapers.

Each shoe comprises on its underside a principal bearing surface 28, which is flat and substantially rectangular, and a rolling surface 29 also flat and substantially rectangular. This rolling face is inclined upwardly in continuation of the principal surface when the shoe rests on a surface by its bearing face. It constitutes the rear head of the body of the shoe.

Each shoe comprises rolling means at each of its ends of the rolling surface 29.

More particularly, each shoe 24 or 25 comprises on its rear head a slot 30 traversed by an axle of rotation 31 for the passage and mounting of a rear roller 32, and at the lower portion of the shoe an intermediate roller 33 mounted rotatably on a swinging axle 34 parallel to the shoe-carrying axle 11 or 12 transverse to the body of the shoe and longitudinally offset from the shoe-carrying axle by a distance "D".

Each shoe 24 or 25 comprises four gripping or holding elements such as 35, for example two rear claws such as 37, in the form of oblique needles directed forwardly of the shoe each mounted in an oblique groove such as 38 on each of the lateral surfaces of the body of each shoe. The forward and rear needles will be indicated by the same reference numerals 36 and 37. They are immobilized in these grooves at a predetermined length of extension from the plane of the bearing face by preferably adjustable blocking means, which is to say permitting modifying the length of extension. This blocking means is, in the embodiment shown in the drawings, constituted by a screw and a bearing ring 39 forcing and wedging laterally the needle in the base of the groove. The direction of the grooves 38 is inclined forwardly so as to impart to the needles a gripping angle effective to move the newspaper.

According to one embodiment, the rings 39 extend slightly beyond the bearing surface 28, such that the general bearing of the shoe on the newspaper is effected by means of these rings.

The discharge assembly also comprises at the rear of the body of the actuator a pressure block 40, for example flat and rectangular, mounted freely at the rear of the body of the actuator and maintained in lateral position. The pressure block 40 carries, on the one hand on its upper portion a bridge of a twinned abutment 41, and on the other hand in its lower portion two lateral bearing rollers such as 42, whose axes of rotation are perpendicular to the body of the actuator and disposed such that the rear of the discharge assembly rests on the stack of newspapers by these bearing rollers 42 and maintains it pressed locally so as to retain it during the duration of the discharge movement of the upper newspaper.

The rollers of the press block also permit letting escape in a convenient way the rear of the newspaper.

The bridge of the twinned abutment 41 is in the form for example of a U-shaped stirrup whose two ends 44 and 45 extend downwardly at a right angle to the bearing and abutment surfaces whose spacing is substantially equal to the distance existing between the two shoes.

Its role consists in preventing simultaneously the two shoes 24 and 25 from swinging downwardly when the body of the actuator is raised.

Figure 19:
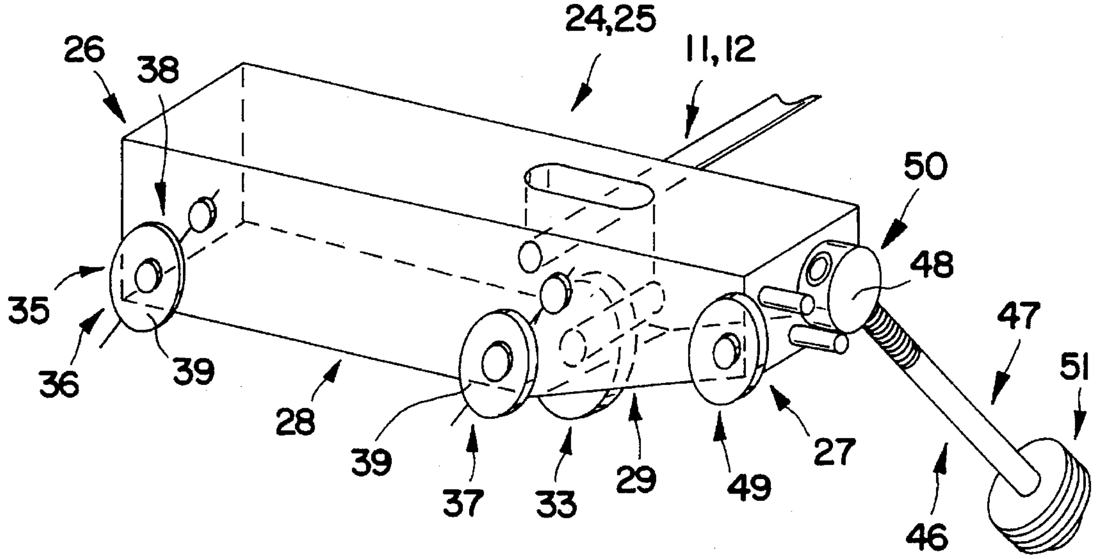
FIG. 19 is a perspective view of a second embodiment of the drive shoes.

A slightly different embodiment of drive shoe is shown in FIG. 19.

This is a drive shoe which could be provided on discharge assemblies adapted for thicker newspapers, hence heavier, or for groups formed of several copies.

The shoes have a different rear configuration provided with a pushing device 46 accompanying the newspaper or the magazine by pushing it on its transverse rear edge.

This pusher device should retract or at least slide or roll on the newspaper 3 immediately below, during return movement.

The pusher device illustrated comprises a balancing finger 47 mounted pivotally on a member with a longitudinal axis 48 perpendicular to the rear surface of the body of the shoe. This axle member is maintained longitudinally by any means, for example by the axle of rotation/rolling of the rear roller, which will be preferably according to this embodiment in the form of two distinct rollers 49 and 50 mounted at the rear on the lateral side of the body, on opposite sides of the axle member 48.

According to this embodiment, the retraction is effected by rolling on the immediately lower newspaper 3. To this end, the end of the balancing finger is provided with a head in the form of a semi-spherical roller 51 of a sufficient mass to permit it to constitute an efficacious return solely by the force of gravity.

According to another embodiment, the slide assembly carrying the actuator and vertical slides is replaced by another vertical guide means, for example a system of roller bearings moving along one or two stacks. In this case, the slight clearance of the actuator body about its horizontal position is removed, and the recess provided on the lower surface of the body can be elongated to the other end of the body, thus reducing the size of the discharge assembly.

Finally, the discharge assembly is controlled by any appropriate circuit or automatic control.

Let us refer now to FIGS. 1 to 14.

Figure 1:
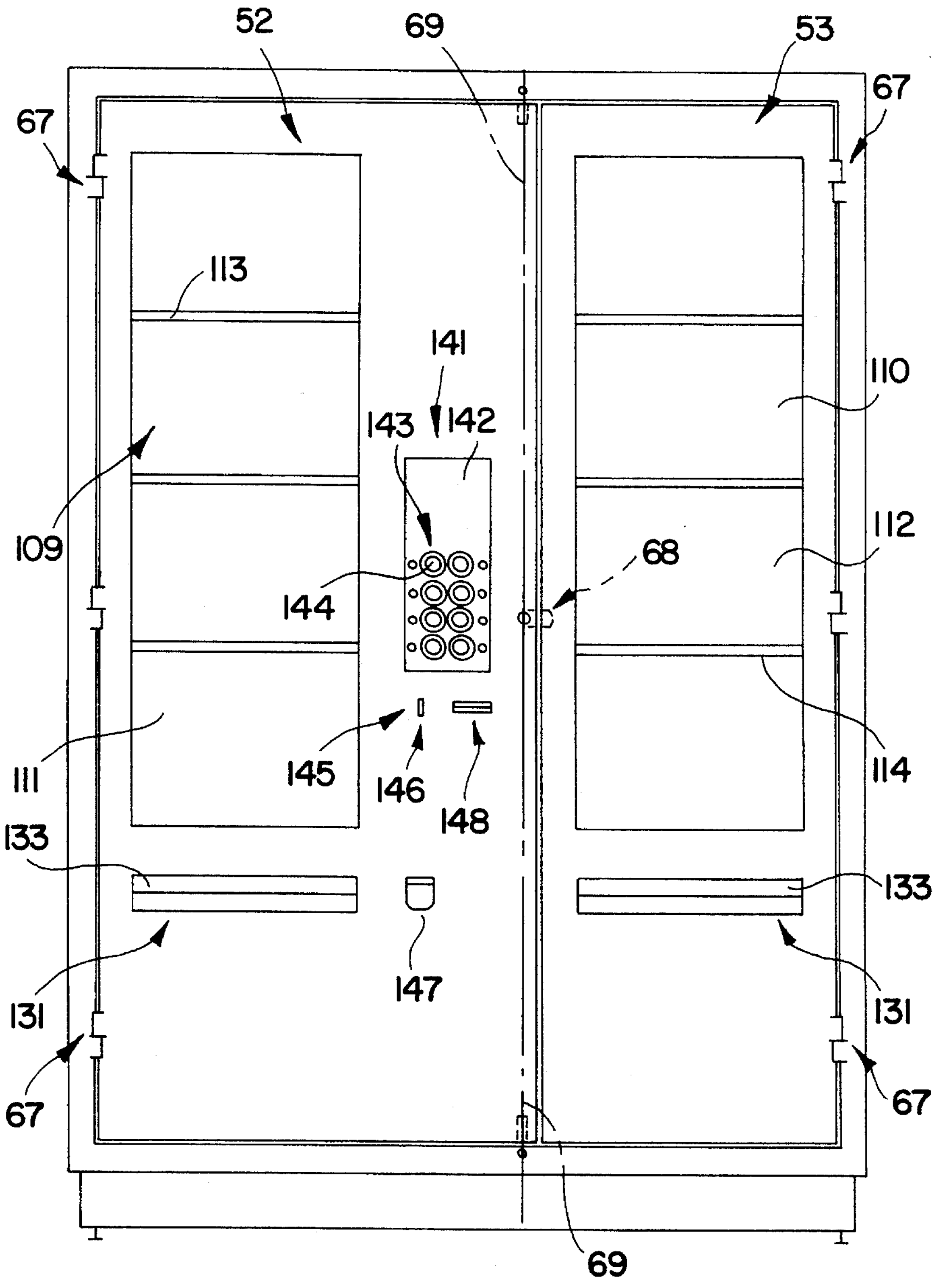
FIGS. 1 and 2 are views in elevation of two embodiments of the front of a vending machine for newspapers according to the invention.
Figure 2:
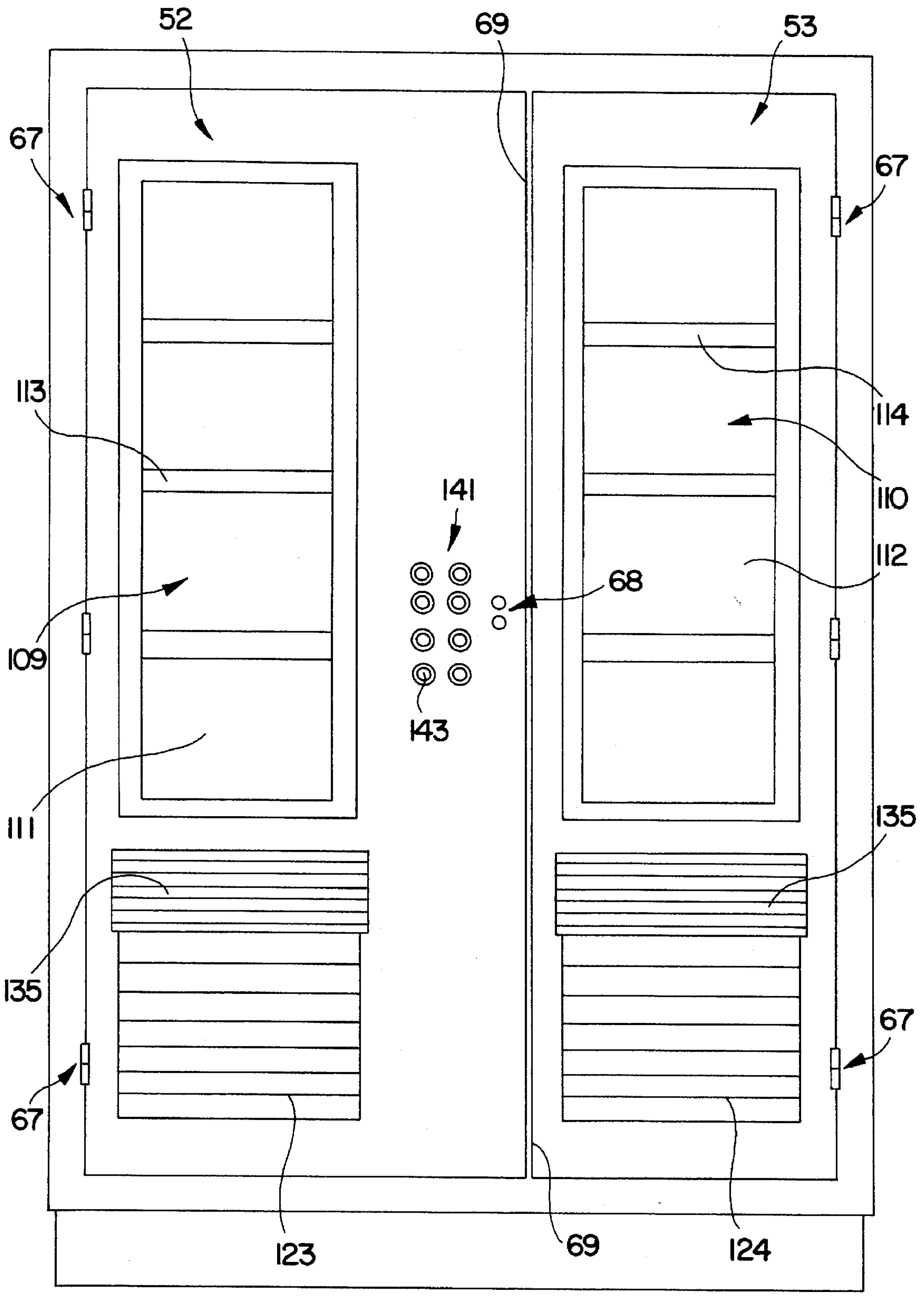
Figure 3:
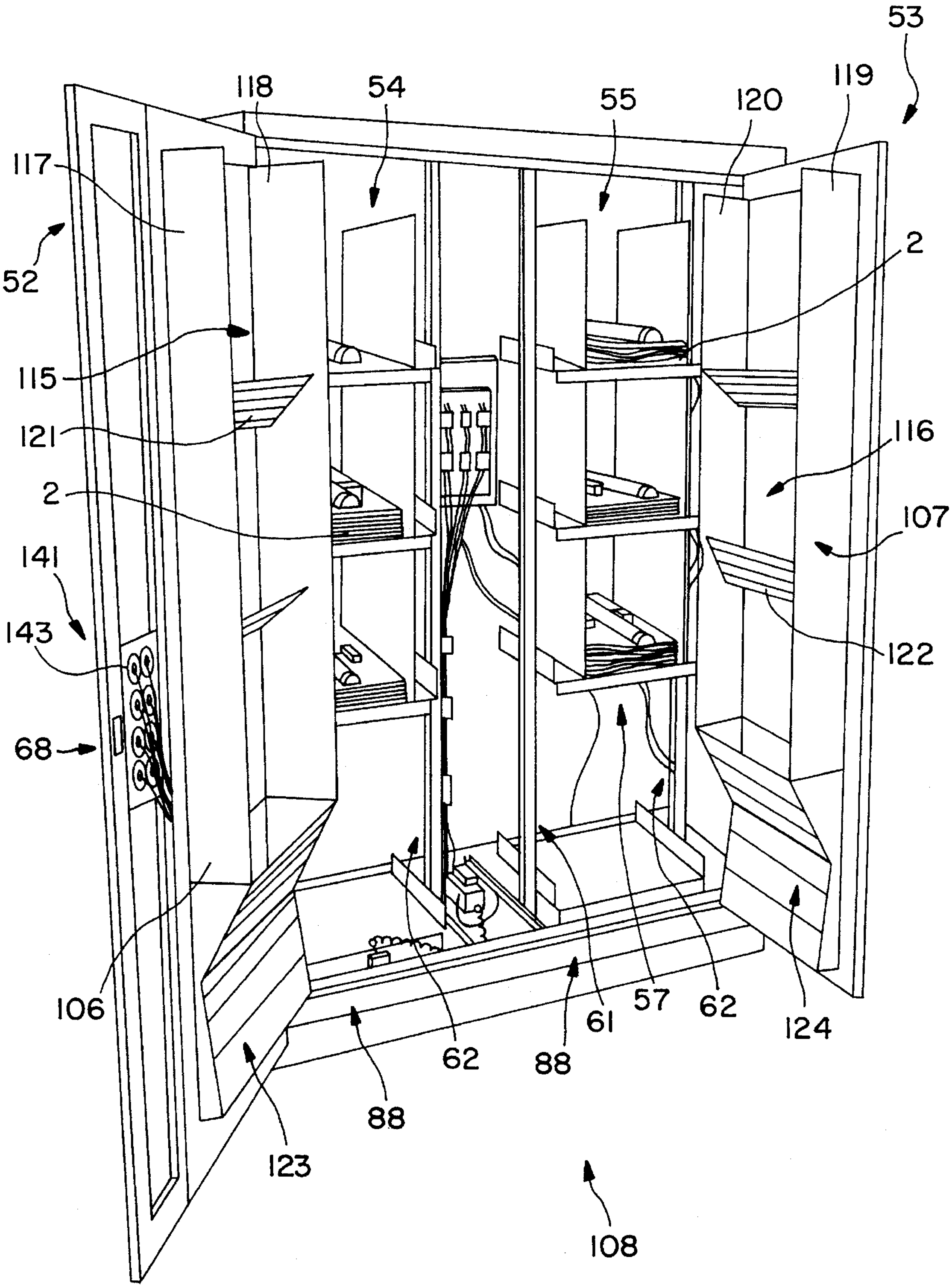
FIG. 3 is a simplified perspective view of the vending machine assembly with the doors open according to one of these embodiments.

The vending machine according to the invention is in the general shape of a cabinet with two doors 52 and 53 and pivoting on lateral hinges (FIGS. 1, 2 and 3).

The body of the vending machine comprises preferably but not necessarily two columns of shelves adjustable in height, a left column 54 and a right column 55. Each shelf 56 of a same column, except the lowermost shelf which will be the object of further description, is present in the form of a lower support plate 57, for example of sheet metal, whose left and right edges 58 and 59 are bent and raised, these edges each having at least one securement hole 60. Thus, each shelf 56 can be secured on each side by at least one bolt or the like, on two vertical supports 61, 62 provided with a plurality of adjustment holes along their height. These supports are fixed and welded by their respective ends on the base and on the top of the body of the vending machine. Each shelf is designed to receive a stack 2 formed of a plurality of individual, multiple or bound sheets that are superposed, already designated newspapers 1, and is provided with lateral abutments 63, 64 and rear abutments 65 and 66 that are adjustable and adaptable to the dimensions of the stack 2 and/or to the shapes of the newspapers.

More particularly, the two doors of the vending machine according to the invention pivot on lateral hinges 67 which cannot be removed when the doors are closed.

The locking of the doors is effected by a lock 68 with three points which control two straps 69 of steel encasing respectively at the top and the bottom the body of the cabinet, and a steel blade extending from the middle of one of the doors to the middle of the other door, this latter comprising an internal counter sheet preventing any opening.

By way of example, there can be constructed a dispenser of the type shown in the figures, with eight choices of newspaper titles, comprising two columns each with four shelves of which three upper shelves are fixed and a lower shelf is movable.

There can also be provided modifications with a single column of shelves and comprising a single door.

Figure 9:
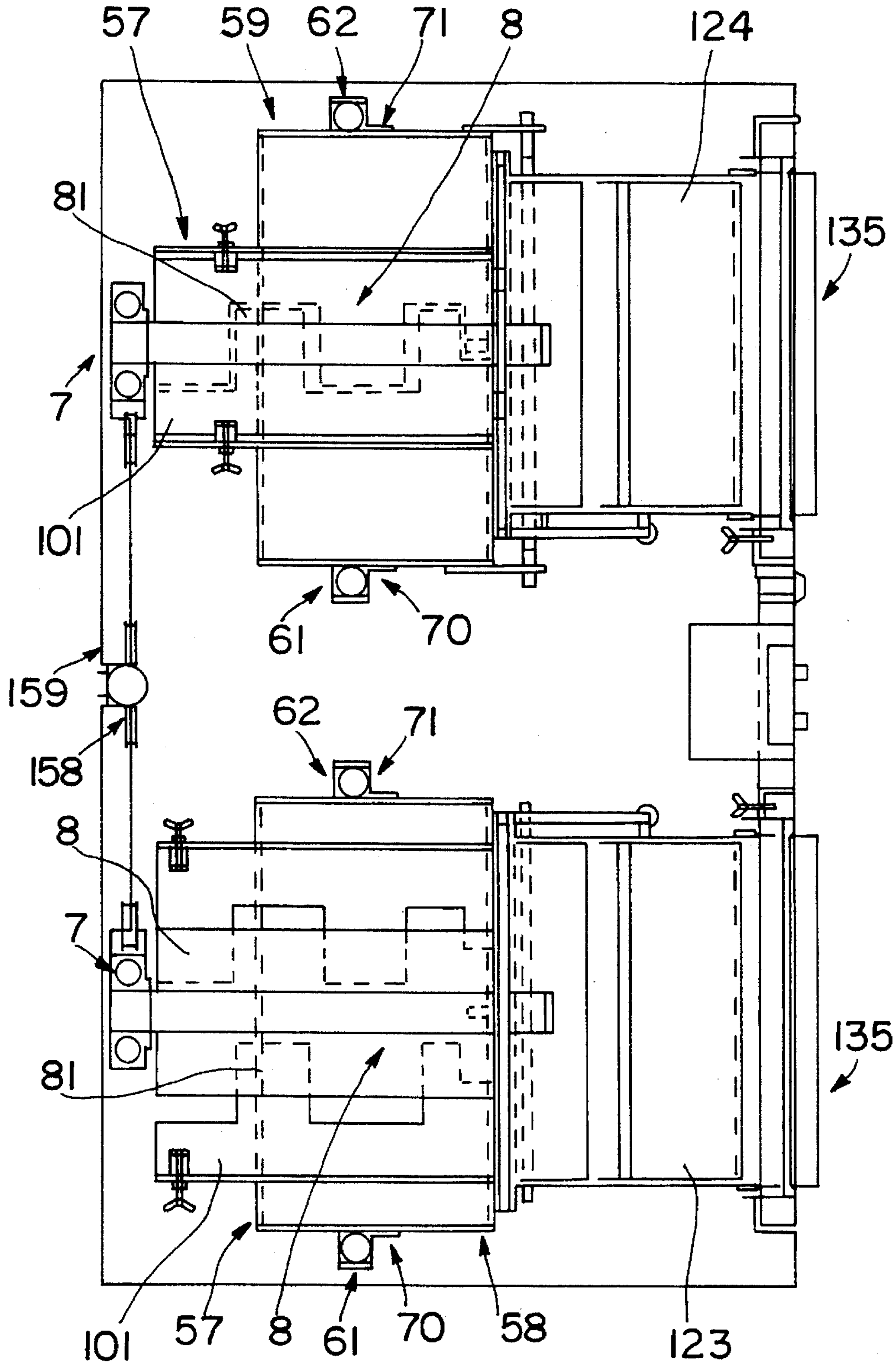
FIG. 9 is a plan view of the vending machine at the level of the fixed shelves.

As indicated, each column is comprised of two profiled supports 61, 62 made of bent steel metal of U shape of which one of the wings is prolongated by a lateral extension 70 or 71 outside and parallel to the base of the U (FIG. 9).

The two profiled supports 61 and 62 are mounted vertically facing each other and are fixed at the top and bottom of the cabinet. Each lateral extension 70 or 71 of the supports has adjustment holes regularly spaced for the securement of shelves of the desired height.

Thus, each fixed shelf 56 can be immobilized laterally by a bolt or the like on the vertical supports, at a variable height, thanks to the adjustment holes, as a function of the size of the stack.

Each fixed shelf 56 is designed to receive a stack 2 of newspapers 1 and is provided with lateral abutments 63, 64 and rear abutments 65, 66 which are adjustable and adaptable to the size of the pile, or to the formats of the newspapers.

Figure 10:
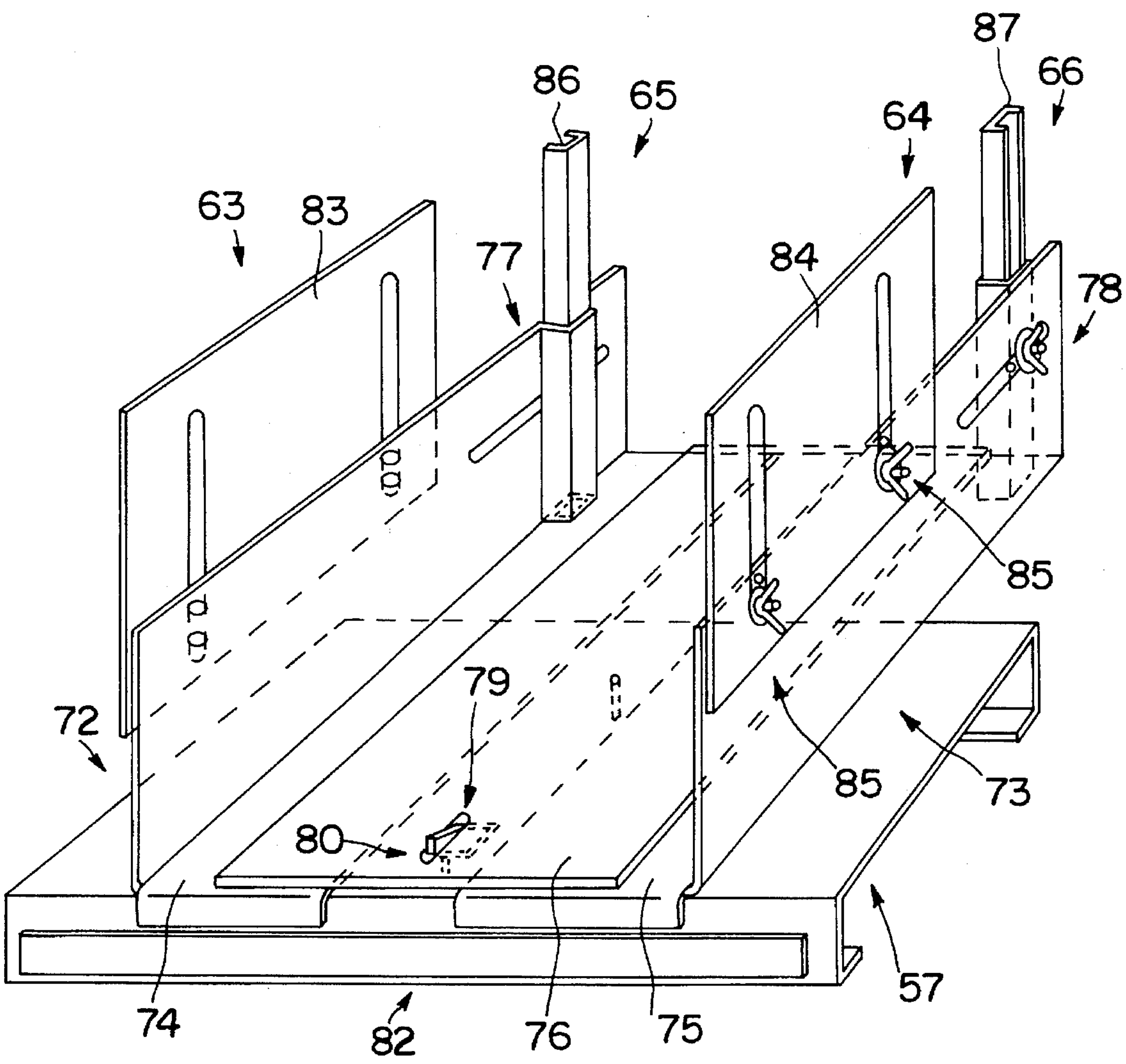
FIG. 10 is a perspective view of a fixed shelf and of its assembly of adjustable flanges.

The lateral abutments 63, 64 are present in the form of two sheet metal flanges 72 and 73, bent to L-shape, turned toward each other (FIG. 10). The two horizontal returns 74 and 75 of the flanges are applied on the lower support plate 57 and are maintained by a counterplate 76 such that the spacing of the flanges 72 and 73 corresponds substantially to the width of the pile of newspapers, the assembly being secured in position for example by bolts with butterfly nuts (FIG. 10).

The rear abutments 65 and 66 are vertical corner pieces on at least one portion of the internal rear vertical edge of each of the flanges, and are adjustable to the depth of the stack of newspapers thanks to an assembly 77 or 78 with a horizontal opening and a nut provided respectively on each of the flanges and its corresponding corner member.

Figure 11:
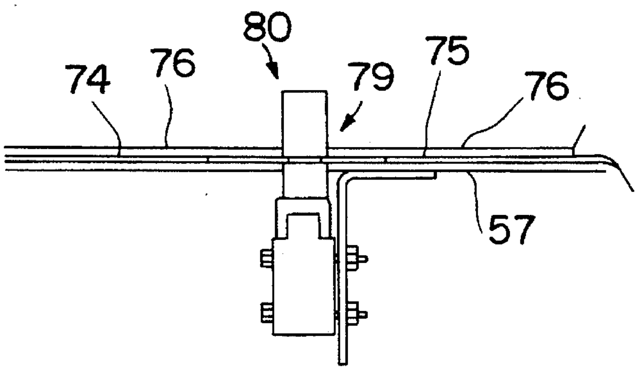
FIG. 11 is a fragmentary horizontal section of FIG. 10 at the level of the micro-contact.

There is provided in the counterplate 76 and in the plate 57 an opening 79 adapted for the passage of a microcontact 80 for detecting exhaustion of the stack fixed below the lower plate, for example in the forward portion or the center of this latter (FIGS. 10 and 11).

The two horizontal returns 74 and 75 of the flanges are cut out to the shape for example of teeth such as 81 disposed in a diamond arrangement (FIG. 9) to permit adjustment of the spacing of the flanges, from a minimum spacing wherein the teeth interfit, to a maximum spacing in which the horizontal portion of each flange remains fixed by the end of these teeth. A graduated scale 82 is provided on the forward portion of the plate 57 of the shelf so as to facilitate the adjustment in width of the flanges 72 and 73.

According to the preferred embodiment which is not limiting but is shown in FIG. 10, the height of the lateral abutments 63, 64 is adjustable by addition of side plates 83 and 84 of steel metal comprising openings. These side plates are fixed on the flanges for example by assemblies such as 85, each comprised by a welded spindle receiving a ring and a wing nut. The corner pieces of the rear vertical abutments 65 and 66 are then replaced by telescopic abutments 86, 87 of iron of U-shape sliding each in a square tube, these square tubes being secured behind the flanges thanks to assemblies 77, 78.

Figure 12:
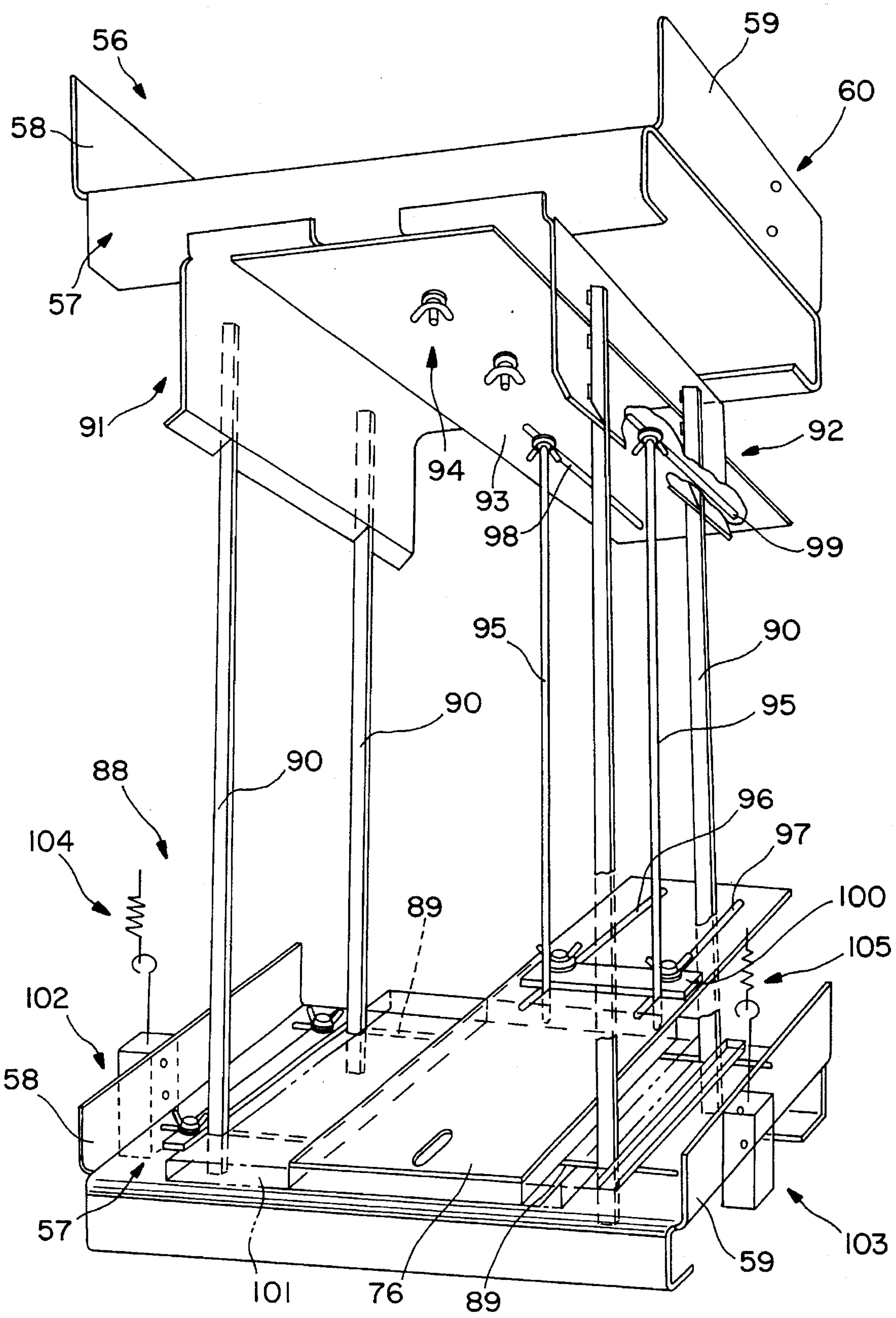
FIG. 12 is a perspective view of a movable shelf.

Each row comprises at its lower portion a lower movable shelf 88, for example like that shown in FIG. 12. Each of these movable shelves is made of bent sheet metal identical to the fixed shelves.

It comprises four recesses such as 89 in its lower plate 57 for the passage of four vertical lateral guides such as 90 and the securement of the positioning heels of these guides.

These vertical guides 90 are for example in the form of flat irons fixed at their upper part to the left and right inverted adjustable flanges 91 and 92 fixed below the lower plate 57 of the lowermost fixed shelf 56. These inverted adjustable flanges 91, 92 are similar to those of the fixed shelves already described but directed downwardly, and gripped by a counterplate 93 with the aid for example of butterfly nuts such as 94. Two rear guides, for example in the form of rods such as 95, have their ends passing respectively through the gripping counterplate 93 of the intermediate upper fixed shelf 56 and the counterplate 76 of the movable shelf 88 through the lower parallel longitudinal openings 96, 97 and upper openings 98, 99. These rear guides are maintained by a positioning heel bar 100 movable along the lower slider.

Moreover, the movable shelf 88 comprises, between its plate and its counterplate 57, a thickness plate 101 having also teeth such as 81 permitting it to remain fixed by the counterplate 57 in the case of wide formats.

The movable shelf 88 is mounted on the supports 61, 62 by means of sockets 102, 103, for example of square cross section, which each come into a mounting 61, 62 of a column. Two vertical return springs 104, 105 are hooked on the one hand to the sockets 102, 103 and on the other hand to the uprights 61, 62 by any suitable means (FIG. 12).

The movable sockets 102, 103 slide vertically along the U-shaped profiles of the supports 61, 62 under the action of the springs 104, 105.

The loading of the fixed shelves 56 or the movable shelves 88, as well as the system of lowering the movable shelves, will be described later.

In the embodiment shown in FIGS. 1 to 3 by way of non-limiting example, the forward openable surface comprises the right door 52 and the left door 53 and corresponding counter doors 106, 107 pivoting relative to each door of the portal 108.

Each counter door 106, 107 comprises a display surface 109, 110 (FIGS. 1 and 2) with frames such as 11, 112 separated by cross members such as 113, 114. Behind the surface of each counter door a specimen of each available newspaper is hooked or maintained by any appropriate means, for example by horizontal crosspieces, according to an unillustrated embodiment.

Each counter door 106, 107 is formed of receptacle compartments such as 115 and 116 delimited by two lateral and vertical rails 117, 118 and 119, 120 interconnected by oblique transverse plates such as 121, 122. Each oblique plate 121, 122 is disposed substantially at the level of a fixed shelf 56 of the vending machine, such that the assembly of rails, counter door and oblique plate forms a guide hopper then a conduit leading each newspaper removed from the stack toward an outlet slot or a receptacle 123,124 of any suitable shape. There will also be provided appropriate support means for each counter door against each door.

Figure 4:
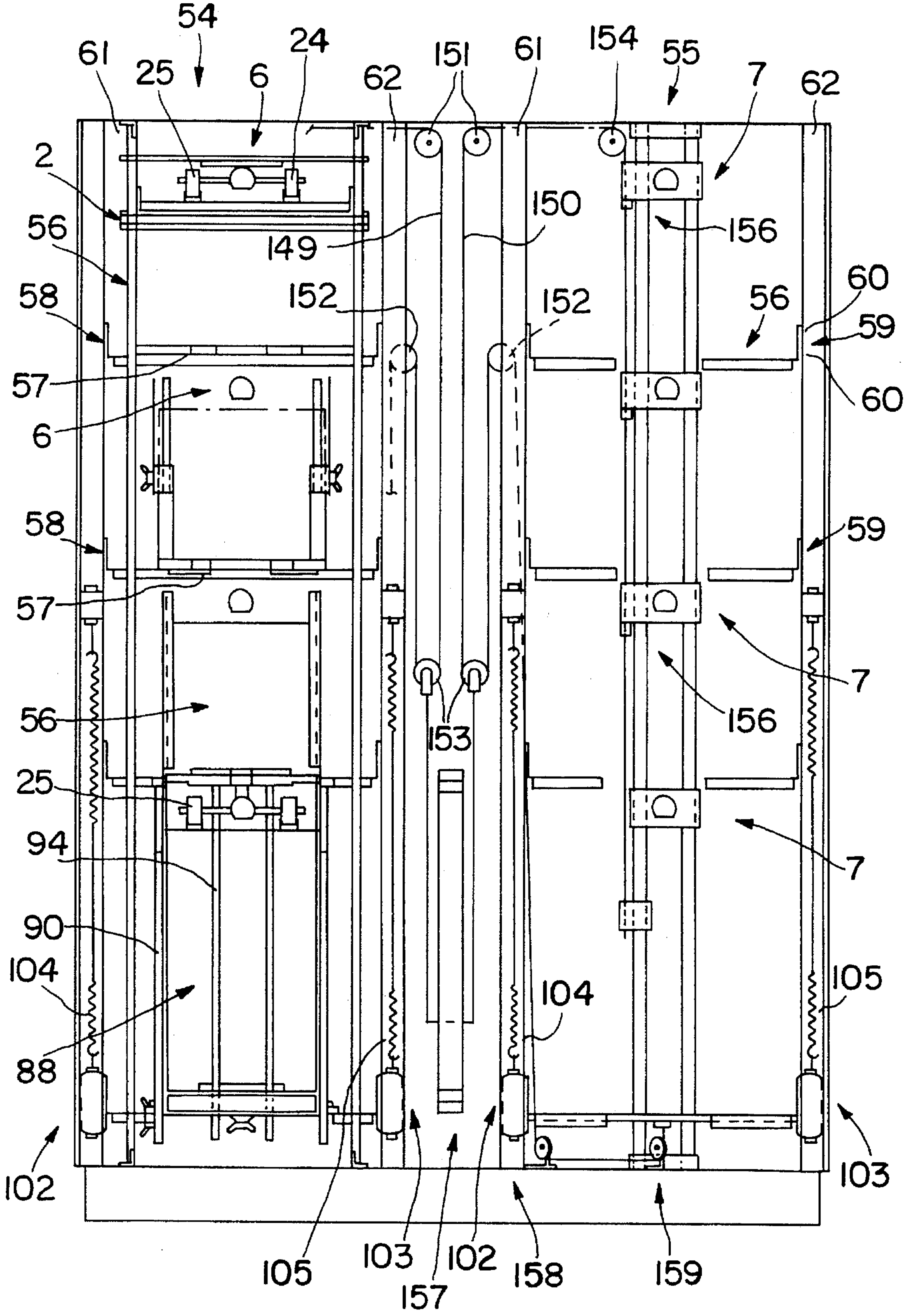
FIG. 4 is an elevational view of the newspaper vending machine, with the righthand shelves removed.
Figure 5:
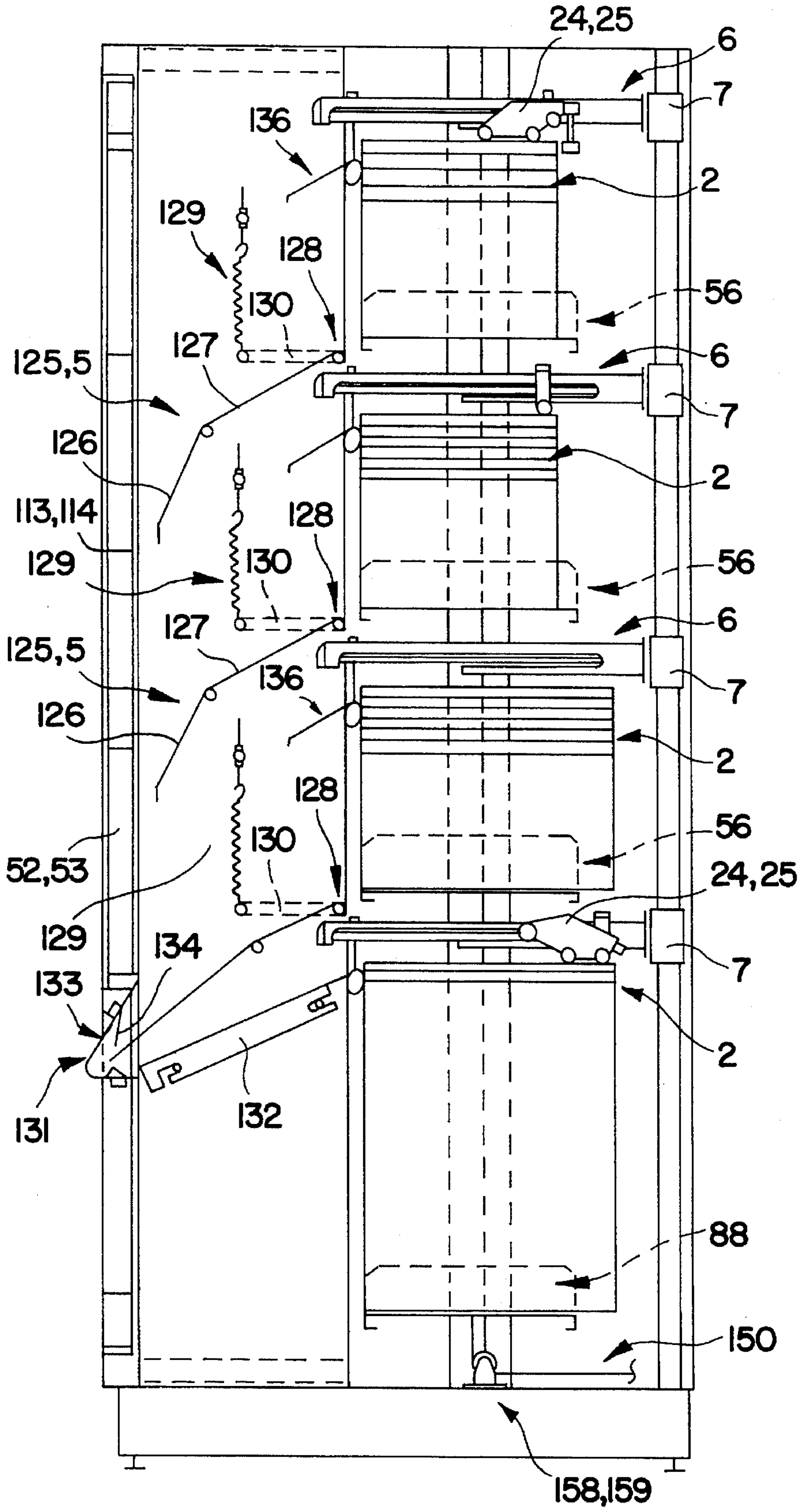
FIG. 5 is a side view of the newspaper vending machine with a horizontal receptacle.
Figure 8:
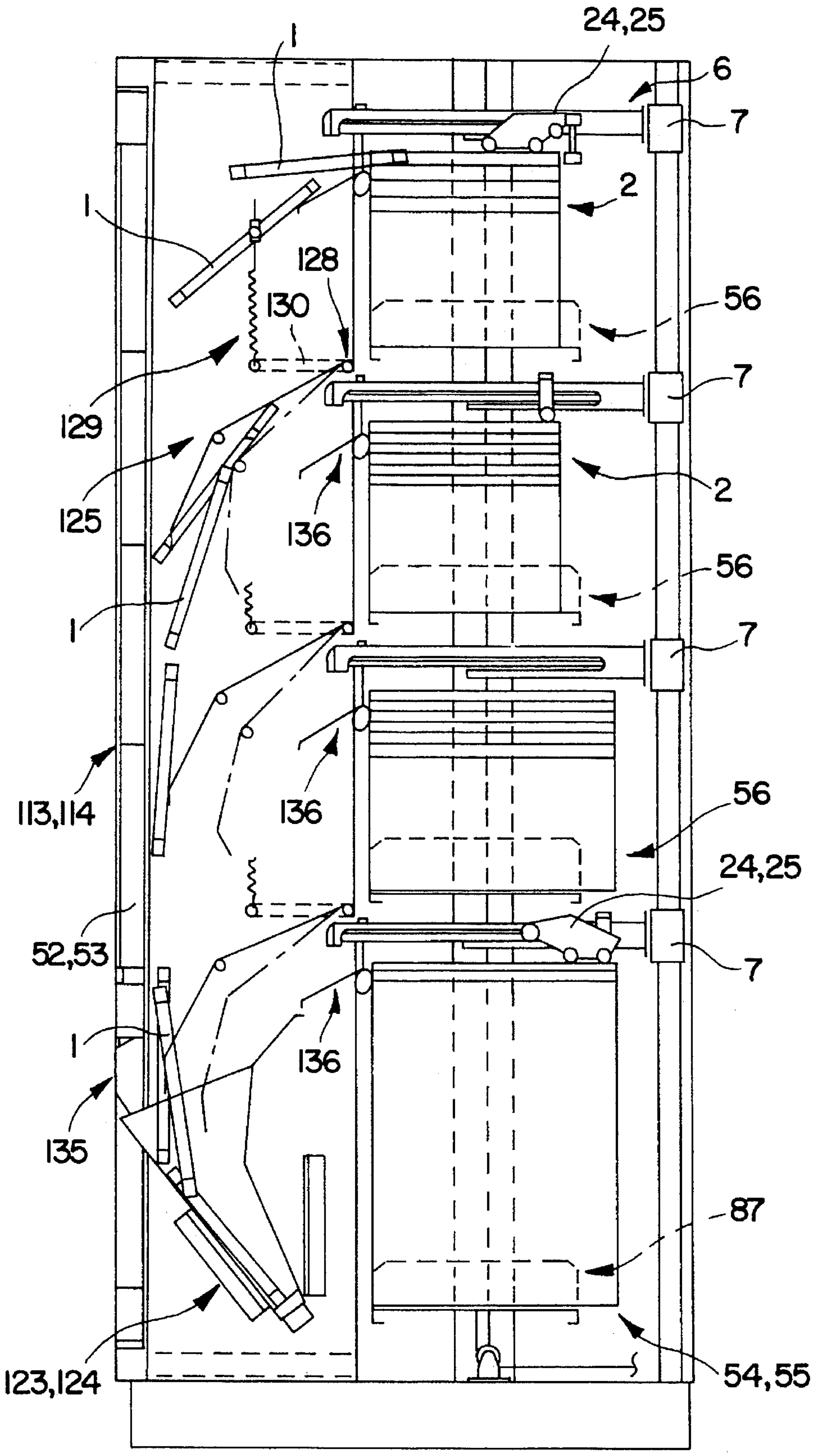
FIG. 8 is a side view of the newspaper vending machine with a vertical receptacle.

According to a modification shown in FIGS. 4 and 5, the vertical rails are secured at upper and lower portions of the cabinet and the oblique transverse plates are replaced by deflectors such as 125 for guiding and cushioning with two guide plates 126, 127 forming between them a predetermined fixed angle. Each deflector of guide cushion 125 is mounted pivotably about a horizontal axle 128 provided in the forward part of each fixed shelf 56 (FIG. 5) and secured to cushioning means 129 with resilient return. These cushioning-return means can be comprised for example in a non-limiting manner by a lever 130 fixed to the deflector whose end stretches a return-cushioning spring fixed on one of the rails when the deflector pivots downwardly. The pivotal axle 128 of the deflector can be fixed on the shelves or on the rails. When a newspaper or an article falls on the guide-cushioning deflector 125, the latter pivots downwardly cushioning the fall of the newspaper, then directs the latter toward the counter door. This cushioning avoids its opening during rain. FIG. 8 shows the sequences of operation of this deflector during descent of the newspaper.

Figure 6:
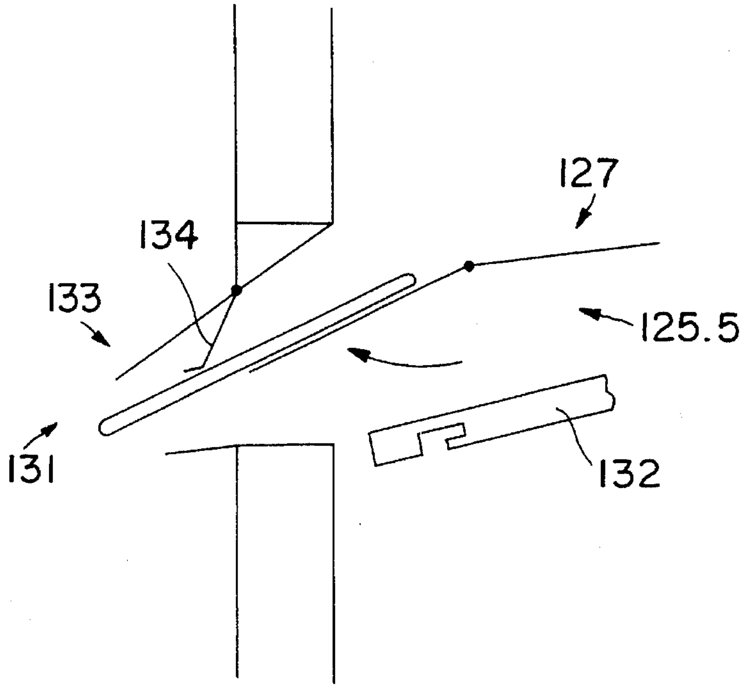
FIGS. 6 and 7 are detailed transverse cross sectional views of the outlet flap of the newspapers associated with a respective column during passage of a newspaper from upper shelves and from the adjacent shelf.
Figure 7:
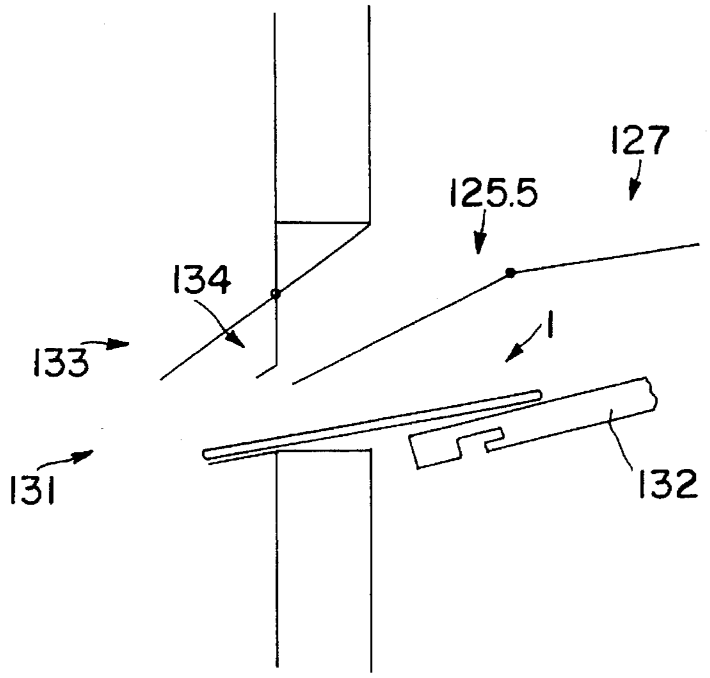

According to the modification shown in FIGS. 5 to 7, the guide-cushioning deflector 125 fixed before the lowermost fixed shelf, directs the newspaper toward an outlet slot 131. If the newspaper comes from the stack disposed on the movable shelf, it is directed toward the same slot 121 by an inclined plane 132 installed facing the lowermost portion of the outlet slot 131 and the upper part of the stack.

The outlet slot 131, rectangular and horizontal, is closed by a protective flap 133 which can comprise on its internal surface a small retarding flap 134 whose weight suffices to slow the exit of the newspaper. There can be provided two micro-contact markers for dispensing of newspapers respectively for a newspaper from a fixed shelf and for a newspaper from a movable shelf.

According to the modification shown in FIG. 8, the newspaper falls into vertical receptacles 123, 124 from which the purchaser can withdraw it by raising a protective shutter 135 of the outlet opening.

Moreover, each shelf is provided with a discharge assembly described above resting on the upper newspaper of the stack of newspapers positioned on the shelf.

Each discharge assembly has for its essential function to enter into gripping contact with a first newspaper 1 of a stack of newspapers, to enter into gripping contact with it for example by gripping it, then causing it to slide on the lower newspaper to the edge of the stack, without crumpling or damage, and without moving the following papers. It then forces it to deflect angularly accompanying it in its curved path about the transverse edge 4 of the stack 2 before freeing it for its falling movement into a receptacle. The discharge assembly then returns to its initial position.

There can also be provided a discharge deflector 136 on the forward side of the stack of papers, for example fixed to the forward end of actuator 6, or on the counterpart which faces it, to force into a curvature the heavier more or less flexible papers. This discharge deflector is not shown in FIG. 4 for purposes of simplification, but is visible in FIGS. 5, 8, 13 and 14.

Figure 13:
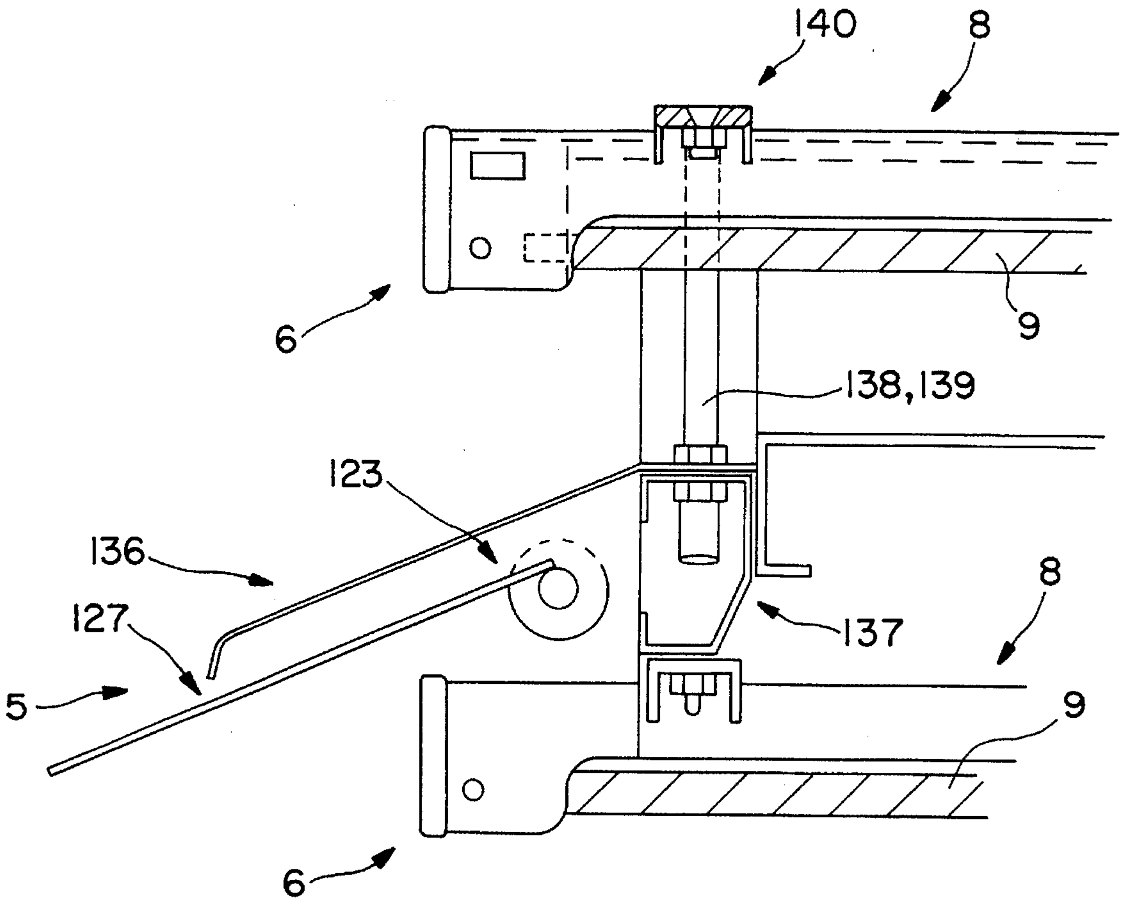
FIG. 13 is a fragmentary cross sectional view showing the forward portion of two actuators and the deflectors.
Figure 14:
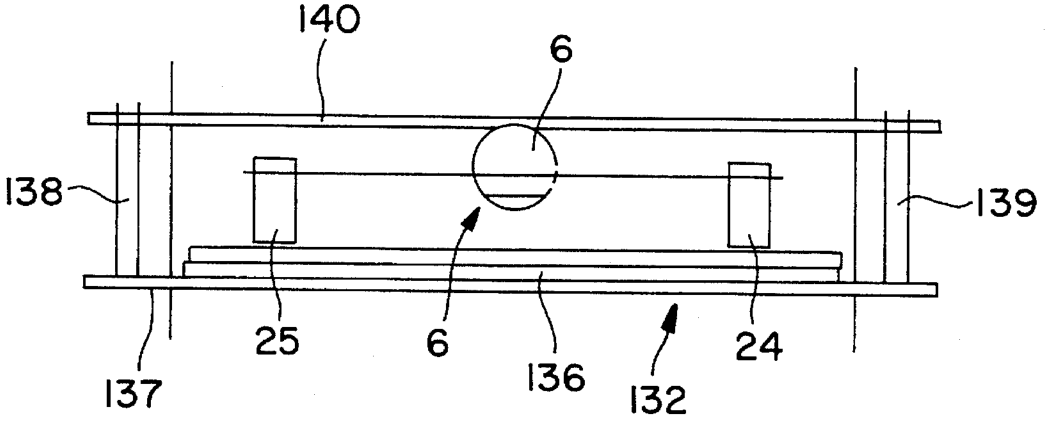
FIG. 14 is a front view of an actuator provided with deflectors of falling.

The discharge deflector 136 shown by way of example is folded metal sheet inclined downwardly, carried by a movable cross member 137 positioned at a fixed distance below the nose of the actuator so as to always be positioned in front of the second newspaper in the stack. This movable crosspiece 137 is itself carried by two vertical bars 138 and 139 (FIGS. 13 and 14) fixed to the two ends of a transverse support 140 welded on the front of the actuator. The movable cross member 137 is for example bent sheet metal or an aluminum profile, whose rear surface plays the role of an abutment for the second newspaper in the stack and the following ones, thereby preventing tipping forward of the stack, it plays the role of a deflector to maintain the stack. The discharge deflector 136 can extend over all the length of the movable cross member or only along a portion of this latter. FIG. 13 shows that when the two successive actuators are in end positions, there is no collision possible between the deflectors 127, 136 or between the deflectors 136 and actuators 6.

Moreover, the vending machine also comprises means for displacing vertically each discharge assembly relative to its corresponding shelf, or vice versa.

Preferably, the two lower discharge assemblies located at the level of the outlet slots are fixed and the corresponding lower shelves are movable, the situation being reversed in the other cases.

The vertical displacement means is for example manual. In this case (not shown), it is comprised of return pulleys fixed suitably on the body of the cabinet, and a cable whose one end is fixed to the slider 7 of the discharge assembly, or with the bottom movable shelf, the other end being adapted to be held to maintain, either the slider 7 in uppermost position, or the shelves in the lowermost position.

The movable sliders 7 return to their lowermost positions under the influence of the weight of the discharge assembly while, for the return of the movable shelves to the upper position, it is necessary to provide suitable return means, for example a simple mechanical spring system.

There can be provided an automatic displacement and return means by the raising-lowering assemblies such as those shown in FIG. 4.

One of the doors, for example the left door, is substantially wider than the other, so as to provide a free surface for the mounting of a selection-payment module 141.

In FIG. 1, for example, the selection-payment module comprises:

- a plate 142 carrying as many selection pushbuttons 143 as there are shelves;
- an illuminated display 144 associated with each button 143 to indicate the exhaustion of a stack of papers;
- a coin changer 145 with a slot 146 for introduction of coins and a receptacle 147 to return change;
- a slot 148 to receive payment by credit card.

The electro-mechanical actuator 6 fixed vertically at the back of the cabinet is the drive element of the discharge assembly. Operation is controlled by selection pushbuttons such as 143 disposed on the plate of the coin box fixed on the doors of the dispenser.

Referring now to FIG. 4 for the description of the raising and lowering assemblies for the lower movable shelves.

Two raising-lowering cables 149, 150, one for each column of shelves, serve to transmit the necessary tractive force for raising the upper discharge assemblies and lowering the lower movable shelves 88. Upper pulleys 151, intermediate pulleys 152, medial pulleys 153 and lateral upper pulleys 154 effect the necessary returns.

The cable 149, 150 passes freely through vertical holes 155 (FIG. 15) provided in the movable slides 7. Under each slide 7, at a distance equal to the height of the stack of newspapers that can be carried by the shelf, a steel nut 156 is fixed on the ends of each of the raising cables 149 and 150. Each of the raising cables passes: through holes 155 of slides 7,

- about the upper lateral return pulley 154 located at the top of the cabinet in vertical alignment with the slides,
- about the intermediate pulley 151 situated at the same level as the preceding and in vertical alignment with a central vertical drive actuator 157 of the raising-lowering assembly,
- about intermediate traction pulleys 153 connected to the vertical actuator.

The same cable serves for lowering the movable shelf. It passes,

- about a pulley 158 fixed to the vertical rear of the cabinet,
- about a pulley 159 fixed in vertical alignment with the preceding pulley, at the rear and at the bottom of the cabinet. When the central actuator 157 is controlled, it pulls the cable, the movable shelf 56 lowers, the nuts 156 fixed on the cables drive the upper discharge assemblies upwardly.

The different phases of operation can be described in detail as follows:

- phase of loading newspapers which consists in:
  - opening the door,
  - raising the discharge assemblies of the upper shelves and lowering the lower shelf 56, either manually, or under the control of the vertical central actuator 157 by pushing on the corresponding pushbutton of the door,
  - removing the deflectors 125,
  - loading the newspapers on the shelves,
  - controlling by the pushbutton or manually the lowering of the upper discharge assemblies and the raising of the movable shelves.
- commercial utilization phase according to which:
  - the choice of newspaper is entered by one of the pushbuttons 143 or touch pads located on the door,
  - the information is given to the coin box which controls display of the prices,
  - after payment, the information is transmitted to the electronic card which authorizes the feed of the electric motor 16 of the discharge assembly of the selected newspaper,
  - the shoes 24, 25 of the discharge assembly move with the newspaper 1 during its fall into the hopper,
  - the forward end-of-path contact 18 of the discharge assembly effects the return of the shoes,
  - the rear end-of-path contact 19 effects cutting off the supply of the motor and advises the electronic card of the return the shoes.

There will now be described the operation and use of the discharge assembly with reference to FIGS. 22 to 28.

The discharge assembly is first raised manually or automatically by sliding or rolling movement of the slide 7 along the slideways or the columns, then is immobilized and blocked by any appropriate means in an upper horizontal position of the body of the actuator so as to be able to impart to the newspapers the designated position.

In this raised position, the two shoes 24 and 25 are maintained horizontal thanks to the ends of abutments of the bent-back wings of the twin abutment bridge 42, and the assembly leaves sufficient space that the stack 2 of newspapers can be loaded on its support.

The discharge assembly is then lowered and positioned on the first newspaper of the stack, where it rests by two rollers of its support block-press 40 and by the forward and rear claws 36 and 37. Any desired adjustment as a function of the type of newspaper can be made at this stage.

During the first actuation of the discharge member and following starting the motor 16, the longitudinal force is transmitted to the two claws 24 and 25 which are driven in the direction of the transverse edge of the stack. The forward and rear claws 36 and 37 sink successively into the first newspaper 1 which is driven by the movement of the shoes. The bearing and retention rollers 42 of the press block 40, which are free in rotation, permit the disengagement of the first newspaper 1 whose end escapes their grip and, under the influence of the weight of the discharge assembly, these bearing rollers 42 come to bear against the newspaper 3 immediately below and thus prevent the pile 2 from becoming dislocated.

In this phase of movement, the drive shoe rests on its pressing base 28 in the mid-course position represented in FIG. 22 and until the phase in which it approaches the edge 4 of the stack shown in FIG. 23.

The drive shoes 24 and 25 perform their drive movement for the newspaper which slides on the lower newspaper 3 used as a sliding support until the forward needles 36 pass beyond the edge 4 of the stack 2 (FIG. 24). Then the front of the drive shoes commences to swing downwardly, accompanying the newspaper about the rounded curvature of the edge 4 of the stack (FIGS. 24 and 25). The two forward needles 36 disengage, thanks to their inclination, from the newspaper which is still maintained by the two rear needles 37 (FIGS. 26 and 27).

The shoe-carrying axles 11 and 12 continue their movement to an end-of-the path position shown in FIG. 13. In this position, the shoes are completely in front of the edge of the stack and pivot almost to the vertical about their axles which are disengaged over a length of the order of several centimeters relative to the upper forward edge of the stack. The rear claws 37, because of their inclination, also disengage from the newspaper which is released above a deflector toward a receptacle, or equivalent recovery means, for its delivery.

It will be understood that, so as not to disturb the curvature of the newspaper in the phases corresponding to those shown in FIGS. 25 to 28, there is provided in a lower forward portion of the body of the actuator, the recess in the form of a cut-out 15 permitting avoiding the lower portion of the body of the actuator from disturbing the curvature and the discharge of the newspaper by reason of its cylindrical form.

The end-of-path contact or forward detector 18 controls the movement of the return of each shoe which rises again on the stack bearing on the middle roller 33. As soon as the shoe-carrying axles arrive opposite the edge of the stack, the shoes are subjected to a swinging couple provided by the offset of the distance "D" existing between the rotation axle 34 of the middle roller 33 and the pivoting axis 11 or 12 of each shoe.

This swinging couple effects up-ending of the shoes at the beginning of retraction movement, a movement which ends with the contact of the end roller with the lower newspaper. This up-ending permits total withdrawal of the needles. This movement transforms into rolling of the shoes on the plane of the newspaper 3 immediately below, carried by the rollers 32 and 33, or 49, 50 and 33.

During actuation of the rear end-of-path contact 19, the motor stops, the drive shoes stop in their up-ended position and the discharge assembly is ready for the following cycle. The shoes will not swing again onto their bearing base until the following actuation.

All these phases of movement are illustrated clearly in FIG. 28.

Figures 20, 21:
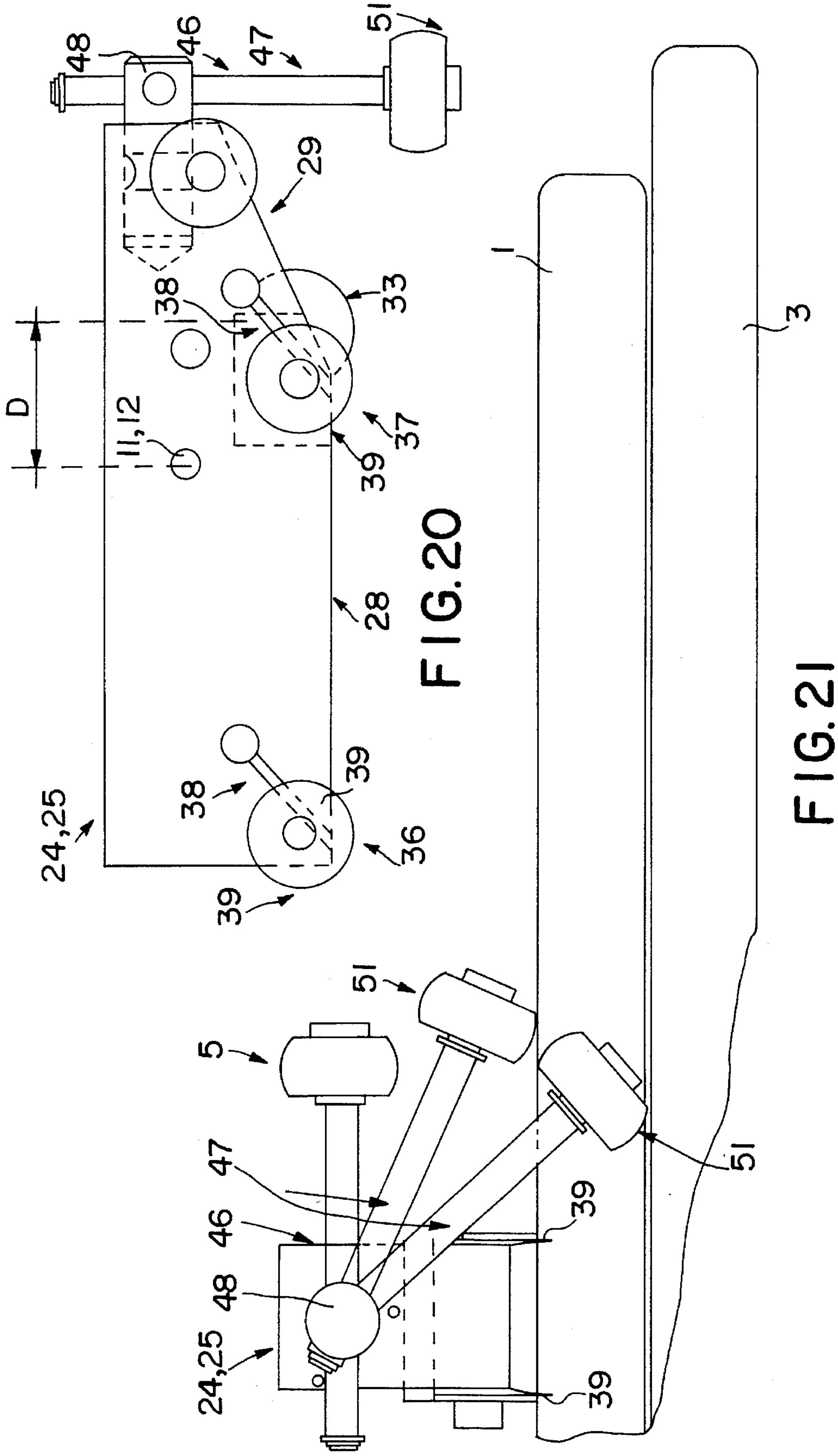
FIG. 20 is a profile view of the drive shoe according to the second embodiment.
FIG. 21 is a rear elevational view corresponding to the shoe of FIG. 17.

In the case of the pusher device, the balance finger 47 pivots upwardly upon rear up-ending movement and rolls on the newspaper immediately below, as shown in FIG. 21. It constitutes a supplemental movable bearing for stability of movement.

In the case in which the discharge assembly is fixed, it is the lower shelf which moves automatically thanks to the return device, from a lower-start position into which it has been moved manually or automatically by means of vertical displacements such as described above and in which it can be loaded, to a raised position by exhaustion of the stack of newspapers. In this case, all the phases of operation of the discharge assembly and of its shoes which have been described remain the same.

I claim:

1. Vending machine (1) for individual, multiple or bound sheets that are stacked, hereafter called newspapers, in the general form of a cabinet capable of automatically delivering into a receptacle one copy of a newspaper which a purchaser has selected from a plurality of other newspapers and paid for with a payment device incorporated in the vending machine, characterized in that the cabinet comprises fixed and movable horizontal shelves on which the newspapers are stored in various stacks each of a same newspaper and in that on each of the stacks is provided an individual discharge assembly for the upper newspaper of the stack of newspapers, there being two columns of said fixed horizontal shelves (56) secured at each side to two vertical supports (61, 62) welded at their ends to upper and lower parts of the cabinet and at least one movable shelf for each column;

means for supporting each stack of newspapers on its shelf;

means for relative displacement and guidance of each said discharge assembly for the upper newspaper from a stack of newspapers relative to the shelf supporting said stack;

means for guiding the newspaper forming a guide path from the edge of the stack from which it is removed, to the receptacle of the cabinet, each column of shelves comprising at least one said fixed shelf (56) adjustable in height by a plurality of securement holes provided on the fixed vertical supports (61, 62), and a said movable shelf (88) disposed at the base of the column, displaceable from a lower loading position, to an upper position in which the stack of newspapers is exhausted.

2. Vending machine according to claim 1, characterized in that each fixed shelf is formed from a horizontal plate (57), and adjustable L-shaped lateral flanges, horizontal portions of the flanges bearing on the horizontal plate (57) by a counter plate (76), the vertical portions of the flanges comprising at least one hole for securement to the adjacent vertical support.

3. Vending machine according to claim 2, characterized in that each fixed shelf comprises moreover vertical corner members provided on at least one portion of the internal vertical rear edge of each of the flanges (72, 73) and adjustable in position by screw means movable along an opening.

4. Vending machine according to claim 2, characterized in that the horizontal portions of the flanges are cut-out in the form of teeth (81).

5. Vending machine according to claim 2, characterized in that the counter plate (76) and the horizontal plate (57) of the shelf comprise an opening for the passage of a micro-contact (80) disposed below the horizontal plate.

6. Vending machine according to claim 2, characterized in that the lateral flanges (72, 73) comprise vertical extensions that are adjustable as to height.

7. Vending machine according to claim 1, the vending machine further comprising:

four recesses in a plate of said movable shelf for the passage of four vertical lateral guides (90) fixed on inverted adjustable flanges (91, 92) turned downwardly and applied against a plate of the fixed shelf immediately above by a gripping counter plate;

two vertical rear guides (94, 95) passing through the gripping counter plate and the counter plate (76) of the movable shelf;

a thickness plate (101) disposed between the counter plate (76) and the plate of the movable shelf; and return springs (104, 106) to raise again automatically the movable shelf to the upper position upon exhaustion of the stack.

8. Vending machine according to claim 1, characterized in that it comprises at least one door (52, 53) for opening the cabinet, each having a counter door (106, 107) fixed to the latter, the counter door having a surface for display of the available titles, and each door having a transparent surface facing a display surface used to present the newspapers.

9. Vending machine according to claim 1, wherein the cabinet has doors each of which has two lateral vertical wings (117 to 120) forming a guide hopper, connected by oblique transverse plates (121, 122) disposed substantially at the level of the shelves and fixed to the door.

10. Vending machine according to claim 1, characterized in that it comprises vertical wings fixed to the cabinet combined with cushioning-guiding deflectors (125) movable about a horizontal axis of rotation (128) provided in front of each fixed shelf (56) and secured to a cushioning-return means (129).

11. Vending machine according to claim 1, characterized in that each discharge assembly comprises:

rear guide means for its displacement relative to the stack;

a horizontal actuator (6) whose body is secured to said rear guide means, and having two lateral axles perpendicular to the axis of the actuator and which are carried by a drive element displaceable along the body of the actuator;

an electric motor (16) driving a screw (9) extending along the longitudinal axis of the body of the actuator to drive the drive element in its reciprocating movement within the body;

two drive shoes (24, 25) mounted pivotally to the ends of the lateral axles of the body of the actuator;

a press block secured to the body of the actuator at its rear end to support the stack of newspapers by bearing on the immediately lower copy.

12. Vending machine according to claim 11, characterized in that each drive shoe (24, 25) has:

a rectangular trapezoidal profile at its rear portion with a bevel directed rearwardly of the stack;

a principal bearing base (28) operative during movement to drive the multiple sheet objects, from which extend individually adjustable gripping elements;

a rolling base (29) operating during the return movement and inclined relative to the principal base (28) in the direction of the rear portion.

13. A vending machine according to claim 1 further comprising at least one cable connected to an electromagnetic central actuator and at least one movable shelf whereby said at least one movable shelf may be lowered.

* * * * *